April 26, 1932.                W. H. SHORTELL                1,855,873
                                CUTTING TOOL
                             Filed Dec. 19, 1928
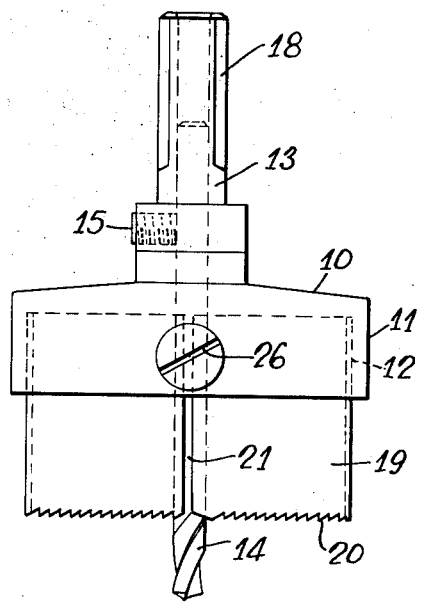
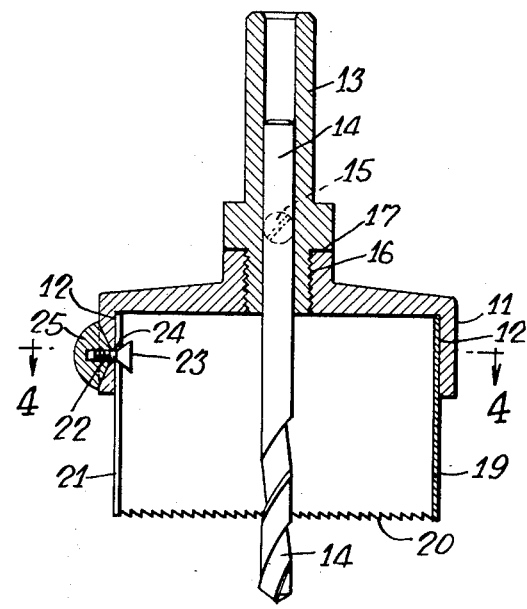
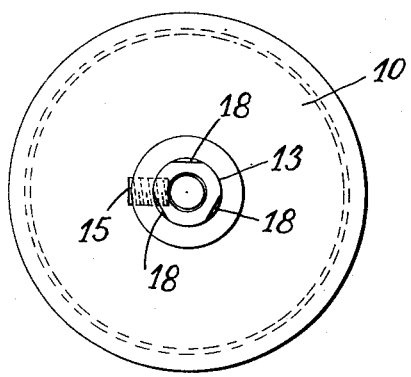
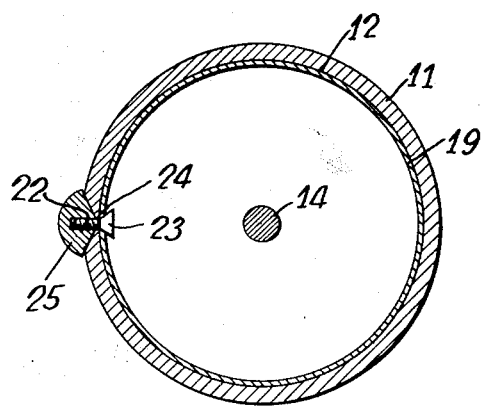
Inventor
William H. Shortell
By Attorney
Warfield & Watson Patented Apr. 26, 1932

1,855,873

UNITED STATES PATENT OFFICE

WILLIAM HENRY SHORTELL, OF WEST HAVEN, CONNECTICUT, ASSIGNOR TO MILLERS FALLS COMPANY, OF MILLERS FALLS, MASSACHUSETTS, A CORPORATION OF MASSACHUSETTS

CUTTING TOOL

Application filed December 19, 1928. Serial No. 326,943.

This invention relates to cutting tools, and, more particularly, to cutter heads of the type known as hole saws.

A general object of the invention is to provide a hole saw which is sturdy in construction, which can be economically manufactured and assembled, and which will operate efficiently and with freedom from breakage and mechanical difficulty.

A more specific object is to provide a cutting tool having a circular blade which may be readily removed for sharpening or replacement and which during operation is securely held in place by novel means, insuring accuracy of cutting and freedom from chattering or other movement.

Other objects of the invention will in part be obvious and will in part appear hereinafter.

The invention accordingly comprises the features of construction, combination of elements and arrangement of parts which will be exemplified in the construction hereinafter set forth, and the scope of the application of which will be indicated in the claims.

For a full understanding of the nature and objects of the invention reference should be had to the following detailed description taken in connection with the accompanying drawings, in which:

Figure 1 is a side elevational view of one exemplification of the invention;

Fig. 2 is a vertical sectional view of Fig. 1, the same being rotated through 90 degrees;

Fig. 3 is a plan view of Fig. 1; and

Fig. 4 is a sectional view along the line 4—4 of Fig. 1 looking downwardly.

By more particular reference to the drawings it will be observed that in the exemplification shown the device comprises a rotatable head 10, which, in a preferred construction, comprises a cup having a downwardly-extending flange 11 forming an interiorly disposed annular seat 12, which is preferably machined carefully in order that the cutting member may be clamped securely thereagainst.

Extending from the opposite side of the head 10 is a tubular shank 13, which is adapted to accommodate a centering drill 14, which latter is held in place by suitable means, such as a set-screw 15. Also, in a preferred form the tubular shank 13 is threaded into the head 10, as by means of screw-threads 16, has a shoulder 17 mating with the top of the head, and is deformed externally by a plurality of faces 18 to form a non-slip surface which may be firmly engaged by a chuck.

Disposed within the annular seat 12 is an annular cutter member comprising a split band 19 having cutting teeth 20, and being generally circular in form and of approximately the same external diameter as the diameter of the seat 12, whereby it may be disposed within said annular seat with its ends preferably only slightly spaced from each other, as at 21. In order that the annular cutter member 19 may be securely positioned within the annular seat 12 in a manner such as to prevent chattering or other movement and to insure accuracy of cutting, there is provided means acting in the space 21 and against the ends of the cutter member 19 for expanding said last-mentioned member into intimate contact with the seat 12. A preferred means of accomplishing this result is shown particularly in Fig. 2, wherein a screw 22 having a wedge-shaped head 23 passes through an opening 24 in the flange 11 into threaded engagement with a nut 25, which is preferably countersunk within the flange 11, as at 26. As will be readily understood, the tightening of the nut 25 will draw the screw-head 23 toward the flange 11, thereby wedging against the ends of the cutter member 19 and widening the space 21 so that the member 19 is in intimate contact with the seat 12 throughout the entire peripheral area of juxtaposition.

It will thus be seen that there is provided a simple and sturdy construction of device which may be readily assembled and will operate with accuracy and ease, and since certain changes may be made in the above construction, and different embodiments of the invention could be made, without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A cutting tool, comprising, in combination, a rotatable head having a downwardly-extending annular flange providing a cylindrical bore and forming a seat adapted to receive a split annular cutter member, a split annular cutter member disposed within said seat, a pin extending between the ends of said cutter member and into said flange, said pin having a wedge-portion adapted to spread the ends of said annular cutter member and to expand the same into tight frictional engagement with said seat as the wedge portion moves toward said flange, and means for drawing said wedge-portion toward said flange.

2. A cutting tool, comprising, in combination, a rotatable head having a downwardly-extending annular flange providing a cylindrical bore and forming a seat adapted to receive a split annular cutter member, a split annular cutter member disposed within said seat, a pin extending radially between the ends of said cutter member and through said flange, said pin having a wedge-portion adapted to spread the ends of said annular cutter member and to expand the same into tight frictional engagement with said seat as the wedge portion moves toward said flange, and means operable externally of said flange for drawing said wedge-portion toward said flange.

3. A cutting tool, comprising, in combination, a rotatable head having a downwardly-extending annular flange providing a cylindrical bore and forming a seat adapted to receive a split annular cutter member, a split annular cutter member disposed within said seat, a radially movable screw having a wedge-shaped head disposed radially with its shank extending between the ends of said split annular cutter member and through said flange and having its head interiorly of said member, said screw head being adapted, when moved toward said flange, to force the ends of the cutter member apart and to expand the cutter member into tight frictional engagement with said seat, and a nut disposed exteriorly of said flange by which said screw-head can be drawn toward said flange to spread the ends of said member.

4. A cutting tool, comprising, in combination, a rotatable head member having an annular flange extending from one side thereof and providing a cylindrical bore and a tubular shank extending from the opposed side, means within said tubular shank for holding a centering drill therein, said annular flange forming an interiorly disposed seat, a split annular cutter member positioned within said seat, a screw having a wedge-shaped head disposed between the ends of said annular cutter member and extending through said flange, a countersunk nut disposed externally of said flange and engaging said screw whereby said wedge-shaped head may be forced between the ends of said annular cutter member to spread the same.

5. A cutting tool, comprising, in combination, a rotatable head having a downwardly-extending annular flange forming a seat adapted to receive a split annular cutter member, a split annular cutter member disposed within said seat, a wedge member disposed between the ends of said cutter member and facing said flange, a pin member associated with said wedge member and extending through said flange, and means associated with said pin externally of said flange for drawing said wedge member toward said flange to spread the ends of said cutter member.

In testimony whereof I affix my signature.

WILLIAM HENRY SHORTELL.